United States Patent Office.

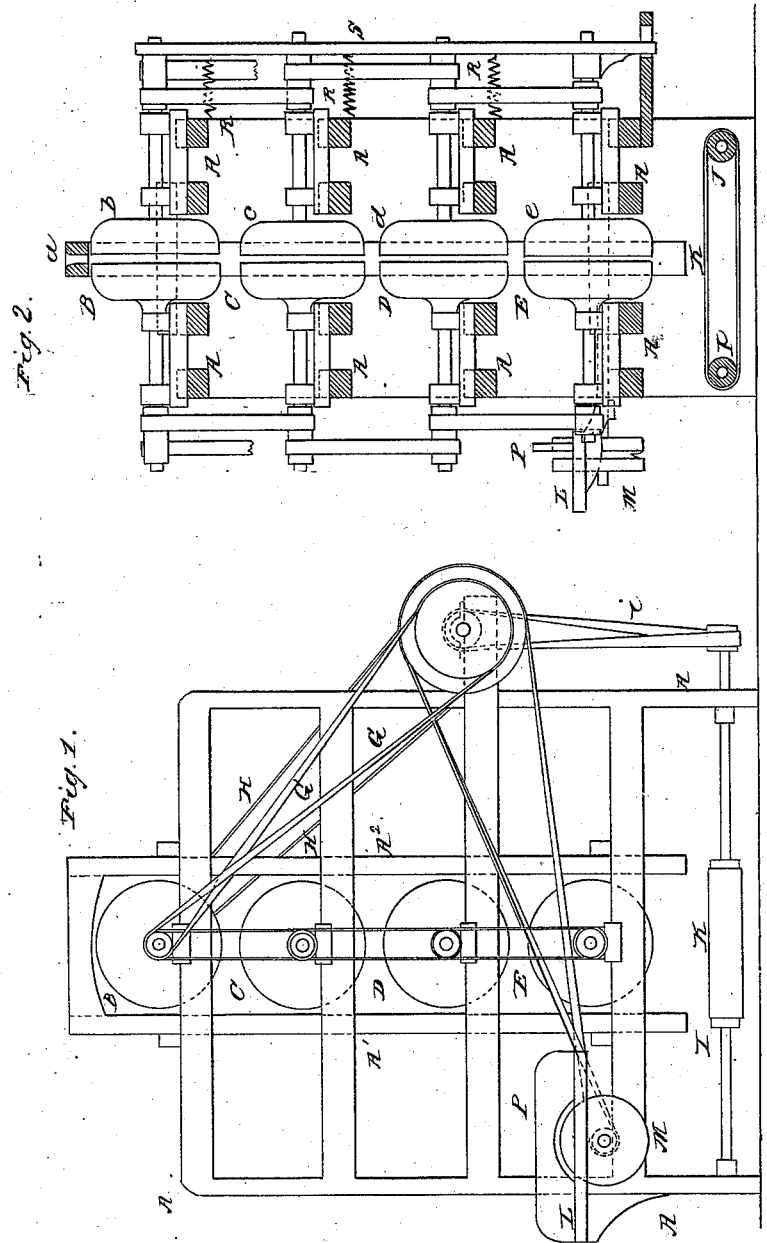

EDWARD SNYDER, OF SLATINGTON, PENNSYLVANIA.

Letters Patent No. 79,784, dated July 7, 1868.

IMPROVED MACHINE FOR POLISHING SLATE, &c.

The Schedule referred to in these Letters Patent and making part of the same.

TO ALL WHOM IT MAY CONCERN:

Be it known that I, EDWARD SNYDER, of Slatington, in the county of Lehigh, and State of Pennsylvania, have invented a certain new and improved Machine for Dressing or Polishing Slates and their Frames; and I do hereby declare that the following is a full and exact description thereof.

I will first describe what I consider the best means of carrying out my invention, and will afterwards designate the points which I believe to be new therein.

The accompanying drawings form a part of this specification.

Figure 1 is a side elevation of my machine, and

Figure 2 is a cross-section thereof.

Similar letters of reference indicate like parts in all the figures.

A A, &c., is a rigid framework, which may be of hard wood. The slates, with or without their frames, are introduced into the machine through a narrow opening at the top, indicated by $a$. It is intended that the slates shall be severally passed through the machine before framing, and thus reduced to a proper surface, and that they shall afterwards be passed through the machine again after being properly enclosed in their wooden frames. The first treatment smooths the slate itself, the second smooths the frames, and does not touch the slates.

B C D E are polishing-wheels, mounted on shafts, supported in bearings on the framing. Opposite each of these are mounted corresponding wheels $b\ c\ d\ e$. A system of belting is provided, which causes all of the wheels, B C D E, to turn together, and all of the wheels $b\ c\ d\ e$ to turn together. Motion is communicated to these several systems from pulleys on the shaft F. The band G communicates motion from the shaft F to the system of wheels B C D E, and the band H communicates motion from the same shaft F to the system $b\ c\ d\ e$. The band G being crossed, and the band H being open or uncrossed, it follows that the wheels B C D E turn in the opposite direction from the wheels $b\ c\ d\ e$. There are thus two systems of polishing-wheels, mounted opposite to each other, the polishing-surfaces being on the parallel plane faces of the wheels, and each wheel turning with an equal velocity to its mate, and in the opposite direction. As the slates, or the slates with their frames, are fed down through the hole $e$, they are successively treated, first by the pair of polishing-wheels B $b$, which should be coarse and adapted to remove the material rapidly, then by the finer wheels C $c$, then by the still finer wheels D $d$, and ultimately by the wheels E $e$, which may be mere brushes of velvet or analogous material, adapted to remove the dust from the surfaces. In being subjected to the action of each pair of wheels, the slate is impelled to turn around in one direction by the action of one wheel, and to turn around in the opposite direction by the action of the other. It follows, from the equal and opposite velocities of the surfaces, that there is little tendency in the slates to turn in either direction, and they ordinarily pass slowly down through the series of wheels without being violently disturbed. The parallel bars $A^1\ A^2$ are mounted close to the peripheries of these wheels, as represented, which prevent the slates from turning around or getting much out of place.

The polishing-wheels may be made of wood, faced with emery, secured by glue, or they may be made of iron, faced with stone, or they may be made of iron or other unyielding material, acting either directly or by the agency of a burr-stone, sand-stone, metallic cutters, or other suitable abrasive or polishing-material, fixed thereon in any convenient manner. One desirable mode of construction would be to make the substance of the wheels of iron, and to face them with hard wood, securely bolted thereon by screws in the obvious manner, the wood surface being better adapted to hold some kinds of polishing than the iron. I and J are rollers, having a slow rotary motion, received through the belt $i$, as represented, and carrying an endless apron, K, which receives the slates as they are delivered from the polishing-wheels, and conveys them carefully out from the end of the machine.

As the slates are successively delivered by the belt K, they are taken by an attendant and placed on the table, L, and slid slowly forward thereon, resting, in the mean time, against the upright support P. In being thus moved forward, the lower edge is dressed by the grooved wheel M, and thus adapted to match in the slate-frame, at a later stage, very perfectly. The slate is turned and subjected to this treatment until all the four edges are thus finished, and it is then laid aside to be framed, and, after framing in any approved manner, it is again passed through the same machine, or another one of similar construction, to smooth the frame. It may be desirable, in some cases, to employ a different polishing-material for the frames from that employed in smoothing the stony surface of the slates themselves.

I adapt the machine to treat different thicknesses of slates and of slate-frames, &c., by allowing one set of the polishing-wheels to yield by the action of springs. This is the set $b\ c\ d\ e$. The other series of wheels, B C D E, is forbidden to move axially to any great extent, but the wheels $b\ c\ d\ e$ may move axially as required; that is to say, they may increase their distances from the opposing set, according to the thickness of the slate, or of other articles which may be introduced to be polished. The springs are represented by R R R, which have a contractile force, and are attached at one end to the framing A, and at the other end to the upright bar S, which forms a bearing for the shafts of the several wheels $b\ c\ d\ e$. It will be observed that the bar S is free to move to any extent required in ordinary practice, and thus the polishing-wheels may adapt themselves to every thickness introduced at the top, automatically opening and automatically closing up again after the thick object has passed.

Having now fully described my invention, what I claim as new therein, and desire to secure by Letters Patent, is as follows:

1. I claim the smoothing-machine herein described, having two or more pairs of polishing-wheels, revolved in opposite directions, and mounted one above the other, so that the slates may feed through the series by gravity, all substantially as and for the purposes herein set forth.

2. I claim, in such machine, automatically increasing and diminishing the distances apart of the polishing-surfaces, so that the machine is self-adjusting for each thickness of slates, substantially as and for the purposes herein set forth.

EDWARD SNYDER.

Witnesses:
JOHN W. NEWHART,
HENRY KUNTZ.